US008150016B2

(12) United States Patent
Baeza

(10) Patent No.: US 8,150,016 B2
(45) Date of Patent: *Apr. 3, 2012

(54) SPEED ACTIVATION OF PRE-DETERMINED CALL-FORWARDING NUMBER

(75) Inventor: Daniel M. Baeza, Fort Lauderdale, FL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 657 days.

This patent is subject to a terminal disclaimer.

(21) Appl. No.: 12/325,955

(22) Filed: Dec. 1, 2008

(65) Prior Publication Data

US 2009/0141882 A1    Jun. 4, 2009

Related U.S. Application Data

(63) Continuation of application No. 10/202,916, filed on Jul. 25, 2002, now Pat. No. 7,460,657.

(51) Int. Cl.
*H04M 3/42* (2006.01)
*H04M 7/00* (2006.01)
(52) U.S. Cl. .......... 379/211.02; 379/213.01; 379/220.01
(58) Field of Classification Search ............. 379/211.02, 379/213.01, 220.01; 455/432.1, 564, 417; 709/223; 370/356
See application file for complete search history.

(56) References Cited

U.S. PATENT DOCUMENTS

| 5,600,704 | A | 2/1997 | Ahlberg et al. |
| 5,946,386 | A | 8/1999 | Rogers et al. |
| 5,999,611 | A | 12/1999 | Tachell et al. |
| 6,141,545 | A | 10/2000 | Begeja et al. |
| 6,157,831 | A | 12/2000 | Lamb |
| 6,188,888 | B1 | 2/2001 | Bartle et al. |
| 6,314,172 | B1 | 11/2001 | Nightingale |
| 6,343,215 | B1 | 1/2002 | Calabrese et al. |
| 6,404,874 | B1 | 6/2002 | Chestnut |
| 6,459,784 | B1 | 10/2002 | Humphrey et al. |
| 6,683,870 | B1 | 1/2004 | Archer |
| 6,771,953 | B1 | 8/2004 | Chow et al. |
| 6,785,560 | B1 | 8/2004 | Chow et al. |
| 6,823,058 | B1 | 11/2004 | Schwend et al. |
| 6,954,524 | B2 | 10/2005 | Gibson |
| 7,242,754 | B2 * | 7/2007 | Adams et al. ............ 379/201.02 |
| 2002/0168061 | A1 | 11/2002 | Bruening et al. |
| 2005/0204030 | A1 | 9/2005 | Koch et al. |

* cited by examiner

*Primary Examiner* — Thjuan K Addy
(74) *Attorney, Agent, or Firm* — Akerman Senterfitt; Michael K. Dixon; Roy Zachariah

(57) ABSTRACT

Methods and systems for providing rapid call-forwarding are described. The method includes receiving a feature code operable for activating a call-forwarding service, receiving a forward code assigned to a target address, such as a dialing number, recognizing the feature code and the forward code, and forwarding incoming calls to the target address. The method further comprises receiving call-forwarding logistics and generating a call-forwarding record. The system for providing rapid call-forwarding includes a switch operable for receiving a selection by a subscriber of a feature code and a forward code, wherein the feature code is used to activate a call-forwarding service and the forward code is used in the place of a target address, a call-forward control computer operable for storing and recognizing the feature code and the forward code, and a call connector operable for executing the rapid call-forward service.

26 Claims, 3 Drawing Sheets

SPEED ACTIVATION OF PRE-DETERMINED CALL-FORWARDING NUMBER

CROSS-REFERENCE TO RELATED APPLICATIONS

This application is a continuation of U.S. patent application Ser. No. 10/202,916, filed Jul. 25, 2002 now U.S. Pat. No. 7,460,657, the disclosure of which is hereby incorporated by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

This invention relates generally to the field of calling features. More particularly, this invention relates to systems and methods for rapid call-forwarding.

BACKGROUND OF THE INVENTION

As telecommunications systems advance, demand increases for subscriber features in both wireless and wireline networks. One example of a subscriber feature that is commonly used is call-forwarding. Conventional call-forwarding systems enable telephone calls directed to a particular dialing number or PBX extension number to be redirected or forwarded to another dialing number. In particular, a subscriber may program a telephone service such that any telephone call placed to the subscriber's dialing number will automatically be rerouted to a forward-to number chosen by the subscriber, thereby causing the telephone at the forwarded number to ring.

One implementation of conventional call-forwarding involves calls forwarded within a private telephone network controlled by a private branch exchange (PBX) system, such as that found in a typical office environment. For example, a subscriber forwards calls from a first office location having a first extension number to a second location within the office having a second extension number. Typically, the subscriber simply presses the appropriate feature button on the first telephone, such as a "FORWARD" key, or enters an appropriate code using the dual tone multi-frequency (DTMF) numeric keypad on the telephone and then enters the extension or dialing number to which subsequent calls to the first dialing number are forwarded. Once the subscriber enables the call-forwarding feature, the PBX forwards all incoming telephone calls intended for the first extension to the second extension.

In a second implementation of conventional call-forwarding, a central office (CO) switch enables a subscriber to forward calls intended for the subscriber's dialing number to any other dialing number. The process requires the subscriber to enter the appropriate code using the DTMF pad on the telephone in order to activate the call-forwarding feature. The subscriber enters the dialing number to which subsequent calls are forwarded. The switch forwards subsequent calls intended for the subscriber's dialing number to the forward-to dialing number until the subscriber turns the service off.

In such an implementation within a provider network, call-forwarding is just one of many special services offered to residential and business telephone subscribers. Special services within a telephone system are supported by the provider's hardware and software. In order to activate an advanced service, such as call-forwarding, a subscriber typically either uses one or more preprogrammed control function keys of the telephone device or enters a touchtone command sequence through the telephone instrument's numeric keypad. Although a control function key is usually more convenient for a subscriber than a touchtone command sequence, the telephone instrument might offer only a fixed number of such control function keys for establishing special services. Therefore, not every service corresponds to a predefined or preprogrammed control function key. Furthermore, with conventional services, each time a subscriber activates the call-forwarding service, the subscriber must manually repeat entering a sequence of numbers, not only to activate the call-forward service, but also to enter the target dialing number.

Thus, a need exists for a simple and flexible method and system for initiating a call-forwarding service.

BRIEF SUMMARY OF THE INVENTION

The present invention relates to an efficient method for enabling a subscriber to forward telephone calls from one telephone dialing number to a target telephone dialing number. In one embodiment, the subscriber establishes a forward-to or target list comprising dialing numbers and assigns a unique forward code to each target dialing number. The subscriber then activates the call-forward service by entering a feature code, typically provided by a service provider. Once the subscriber activates the service, the network element on the provider's network requests the target dialing number. The subscriber enters the forward code instead of a dialing number. The service then determines the target dialing number corresponding to the forward code and forwards subsequent calls to the dialing number.

Another feature of the present invention relates to the call-forward system providing enhanced call-forwarding features. The call-forwarding system is capable of accepting and storing a plurality of forward-to numbers and forward codes. The system also allows a subscriber to determine what forward code is assigned to what forward-to number, making it easy for a subscriber to use the service without having to remember complicated dialing procedures and directions. Furthermore, the subscriber can reprogram the call-forwarding system at any time, allowing the subscriber to add or delete numbers from the memory.

One embodiment of the present invention is a system that includes a switch for receiving the feature code and a forward code, corresponding to a dialing number. The system also includes a call-forward control computer in communication with the switch. The call-forward control computer stores the forward code or codes and recognizes the feature code. The system also includes a call connector in communication with the call control computer. Either the switch or the call-forward control computer may include the call connector functionality.

In one embodiment, the call-forward control computer also includes a database for storing the dialing number and the forward code. The database may also store a call-forwarding start and/or end time. In another embodiment, the database stores a subscriber profile. The database is stored in an element of the service provider's network. In another embodiment, the subscriber's device stores the dialing number and the forward code.

In an embodiment of the present invention, the system receives a feature code, which instructs the system to activate call-forwarding. The system then receives a forward code, which corresponds to a target dialing number. Any subsequent calls directed to the dialing number associated with the call-forwarding service are redirected to the target dialing number. The forwarding may be switch-based call-forwarding or service control point-based call-forwarding. Also, the target dialing number and the forward code may be stored in the memory of the subscriber's telecommunications device, the switch, the service control point, or some other element of the network.

In another embodiment, the target dialing number and the feature code are stored in the database of a call-forward control computer. The computer may also receive call-forwarding logistics, such as a call-forwarding start time or end time. The logistics may also include a subscriber profile. The computer may receive the logistics from a subscriber input form, from a file transfer, or from some other means. In order to bill the subscriber, an embodiment of the present invention may generate a call-forwarding record.

In an embodiment of the present invention, the call-forwarding system comprises an intelligent switch having a DTMF tone detection unit for receiving the forwarded telephone call and for decoding the forward code and the target dialing number. The switch prompts the subscriber to enter a target dialing number and forward code, and these numbers are stored in a database or memory. When a telephone call is subsequently placed to the subscriber's dialing number, the call-forwarding system receives the call and automatically forwards the call to the target dialing number.

BRIEF DESCRIPTION OF THE DRAWINGS

These and other features, aspects, and advantages of the call-forwarding systems and methods of the present invention are better understood when the following Detailed Description of the Invention is read with reference to the accompanying drawings, wherein.

DETAILED DESCRIPTION OF THE INVENTION

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention.

The term "telephone" is used herein to include all devices, both wireless and wireline, capable of sending and/or receiving a voice communication. Each telephone operates within a wireless or wireline network. In an embodiment of the present invention, a call-forwarding service subscriber desires to forward calls directed to one dialing number to a second dialing number. Typically, the dialing numbers correspond to telephones disposed at two different locations, enabling a person to receive calls at a different location from where the telephone associated with the dialing number called is located.

Figure 1:
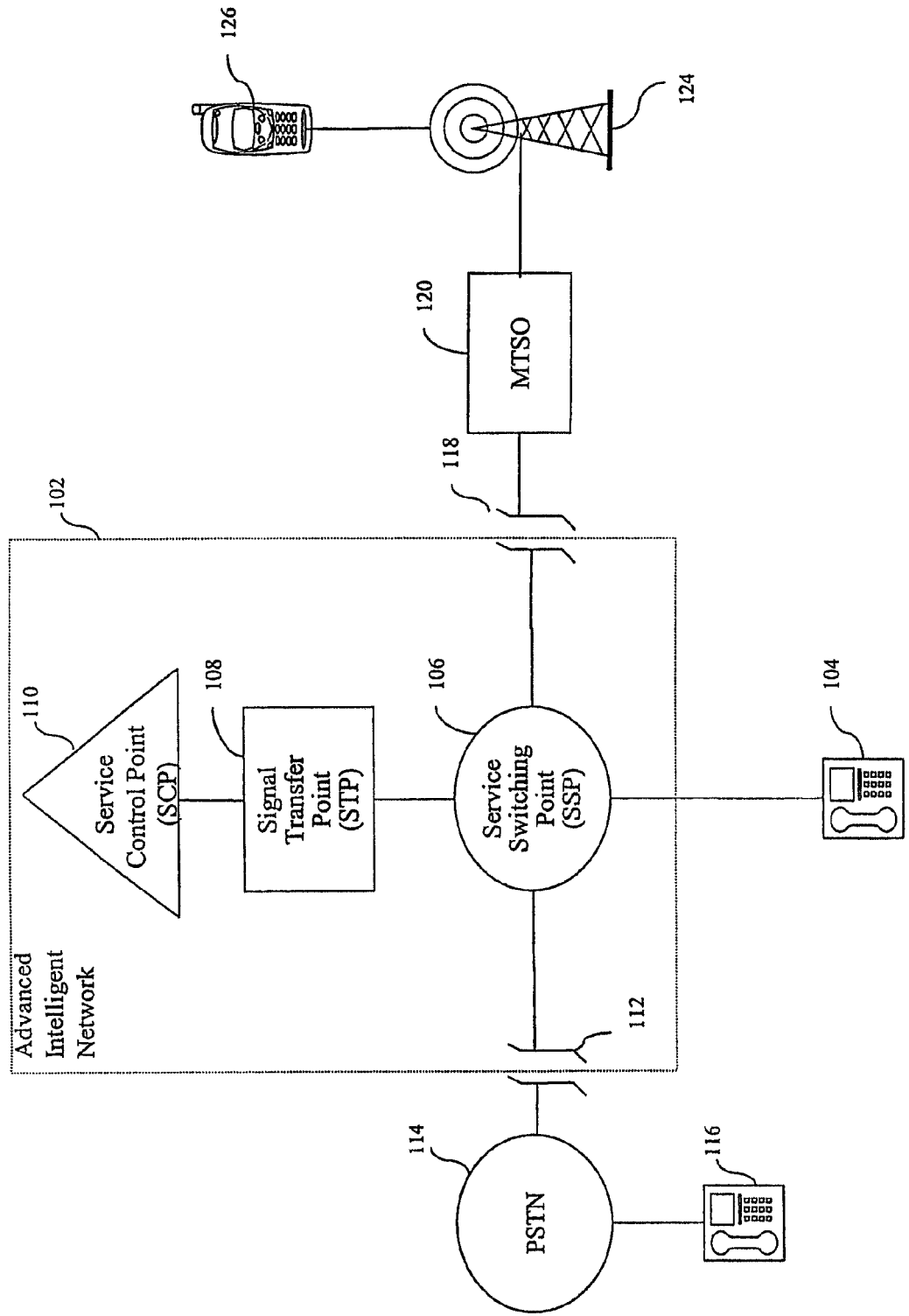
FIG. 1 is a functional block diagram, illustrating a hardware environment for establishing rapid call-forwarding in accordance with an exemplary embodiment of the present invention.

Referring now to the drawings, in which like numerals indicate like elements throughout the several figures, FIG. 1 illustrates an exemplary environment for establishing rapid call-forwarding, according to an embodiment of the present invention. The embodiment shown in FIG. 1 utilizes components in an advanced intelligent network (AIN) 102. An AIN includes a plurality of hardware and software elements operating over industry standard communication protocols, including signaling system 7 (SS7). For the sake of brevity, only a basic description of the AIN is provided herein. For further information regarding aspects of the AIN, refer to Weisser, U.S. Pat. No. 5,430,719, which is incorporated herein by reference.

In one embodiment of the present invention, the subscriber's telephone 104 is connected to a service switching point 106 within the AIN 102. The SSP 106 is a central office switch that provides intelligent network functionality. When a call is placed or received at the SSP 106, the SSP 106 collects the dialed digits and generates a trigger. A trigger generates a packet that is sent through a signal transfer point (STP) 108 to a service control point (SCP) 110, causing the SCP 110 to query its database (not shown) to determine whether to provide conventional telephone service or an enhanced service for the call. Signal transfer points, such as STP 108, are packet-switching systems that can route and concentrate messages exchanged between service control points and service switching points. The SCP 110 includes computer processors, application software, and databases that control the setup, monitoring, and termination of phone calls. In one embodiment, the SCP 110 functions as a call-forward control computer as well as a call connector. In other embodiments, the SSP 106 performs either or both of these functions. The database may be implemented as shared memory (or a shared file or directory) resident on the SCP 110, or as a peripheral device or as a separate and distinct processor in communication with SCP 110.

The SSP 106 in the embodiment shown in FIG. 1 is connected via interfaces 112, 118 to external networks. Typically, the interfaces 112, 118 to the AIN 102 are access tandems or similar network elements. Such interconnection is necessary so that a call from a wireline unit such as a telephone may be connected to a wireless unit such as mobile telephone or to wireline devices in other networks. For example, SSP 106 is connected to an interface 112, which is connected to the public switched telephone network (PSTN) 114. The PSTN 114 provides access to the SSP 106 to devices such as telephone 116.

The embodiment shown in FIG. 1 also includes an interface 118 that connects the SSP 106 to a wireless network. The wireless network includes a geographic radio service area divided into cells, with each cell being generally serviced by a cell control, such as mobile telephone switching office (MTSO) 120. MTSO 120 may also be referred to as a mobile switching center (MSC).

The wireless network also includes an air interface 124, which in FIG. 1 is illustrated by a broadcast antenna. The air interface 124 permits communications between a wireless unit operating within the area of the cell, such as cell phone 126, and the MTSO 120. The air interface 124 may be in communication with a variety of other cellular-capable devices as well.

Many other interfaces may also communicate with SSP 106. For example, a private branch exchange (PBX) (not shown) may allow a business customer to communication with the SSP 106 in the AIN 102.

Figure 2:
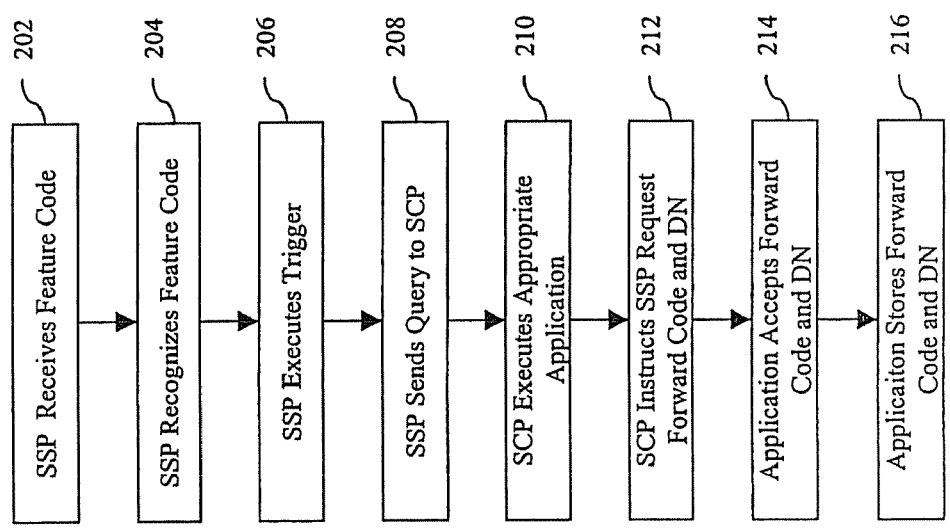
FIG. 2 is a flow chart, illustrating a process of receiving and storing forward codes and associated target dialing numbers in accordance with an exemplary embodiment of the present invention.

In an embodiment of the present invention, the subscriber establishes a set of call-forwarding dialing numbers and associated forwarding codes. FIG. 2 is a flowchart illustrating the process of establishing call-forwarding codes. The subscriber picks up the phone (104) and enters a feature code, such as "*12" 202. The SSP (106) recognizes the feature code 204 and, in response, executes a feature code trigger 206. The trigger results in the SSP (106) sending a query to the SCP (110) 208. The SSP 104 pauses as the query is routed through the STP (108) to the SCP (110).

In response to the query, the SCP (110) executes the appropriate software application 210. According to the instructions from the executing application, the SCP (110) instructs the SSP (106) to request a forward code and a dialing number 212. The SSP (106) prompts the subscriber to enter the parameters, accepts the parameters, and passes them to the application executing on the SCP (110) 214. The application then stores the code and corresponding dialing number in a database (not shown) in the SCP (110) 216.

In various other embodiments, various devices within the communications network store the forwarding information. For example, in one embodiment, the SSP (106) stores the code and corresponding dialing number for call-forwarding purposes. In addition, the type and amount of data stored may vary as well. Call-forwarding data according to the present invention includes a forward code and a corresponding destination address, such as a target dialing number. Call-forwarding information may include a subscriber identifier and personal subscriber information. In the embodiment described with reference to FIGS. 1 and 2, an address comprises a dialing number. In other embodiments, the destination address is an Internet protocol (IP) address, an email address, or another address, which identifies a destination to which a call may be forwarded.

In an embodiment of the present invention, a subscriber may input or receive call-forwarding and profile data via various methods. These methods include a menu-based dual tone multiple frequency (DTMF) entry system, which guides the subscriber through a menu of provisioning options. The subscriber uses the touchtone telephone keypad to respond to the menu. The entry system software captures the subscriber's responses and formulates these responses into a call-forward-to information record, which may then be stored in a database. Other embodiments utilize automatic speech recognition (ASR) and fax-based systems. Such methods may be implemented via hardware and/or software executing on the various hardware components of an embodiment such as that shown in FIG. 1.

Other methods available to subscribers with Internet access include the use of a web-based form, a formatted file, and a formatted email message. When using a web-based form, a subscriber having a browser running on a computer with an Internet connection accesses a provisioning form by supplying a uniform resource locator (URL) for such a form. The subscriber may enter provisioning information (such as subscriber name, a list of forward-to dialing numbers, and forward codes) into the form and send the form entries as a query string, in one embodiment, to a provisioning software interface.

Other methods include sending a formatted email or a formatted file from a subscriber computer to the system. An exemplary formatted email message may have a subject line of "CALL-FORWARDING", and contain labeled lines within the body of the email. Such labeled lines may take the form of: "FORWARD-TO-NUMBER1=5185551234", "FORWARD-TO-NUMBER2=5185559876", and "FORWARD-TO-NUMBER3=2025554567". When the SCP 110 receives an email having a "CALL-FORWARDING" subject line and containing the above labeled lines, the SCP 110 will extract the values to the right of the "=" for each labeled line. These extracted values may then be used to populate a call-forward information record, which is then stored in a database of SCP 110. The information record will subsequently be used by a call-forwarding establishment subsystem to establish a forwarded call when received.

A similar method may be employed using formatted files. Such files may also contain labeled lines, and are electronically transferred via file transfer protocol (FTP) or another file transfer utility.

Additionally, such methods may be readily adapted for subscriber profile data. For instance, a subject line of "PROFILE" may indicate that the email is to be processed by the SCP 110 as containing labeled lines indicating a forward-to device identifier or dialing number ("FORWARD-TO-DEVICE="), office number ("OFFICE="), home number ("HOME="), cellular or wireless number ("CELL="), and/or Internet address ("IP="). In the case of profile data, however, the SCP 110 would construct a profile record, and store the profile record in the database. Similar methods, as those previously discussed, may be used for all client devices, including cellular phones and other thin client devices.

Figure 3:
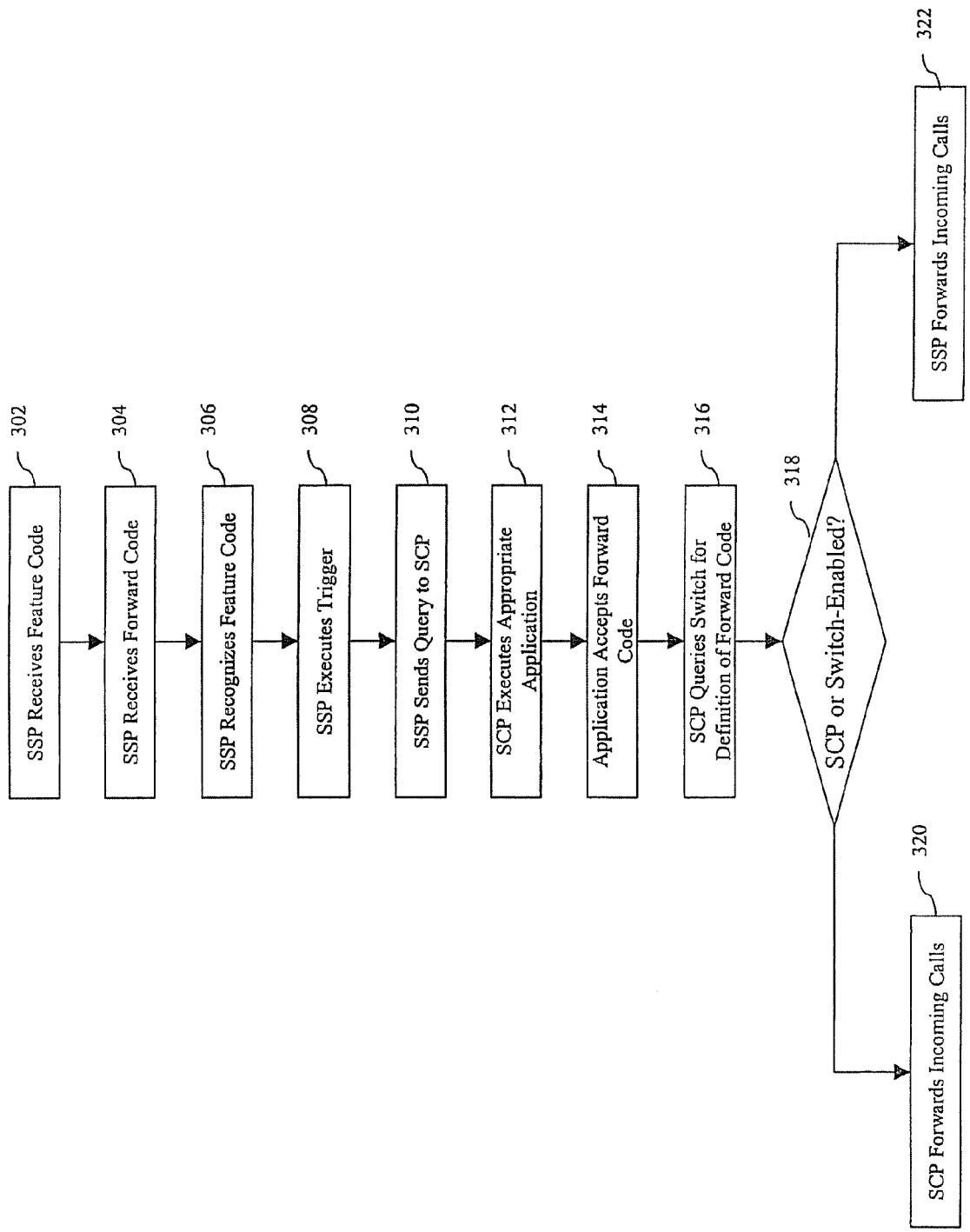
FIG. 3 is a flow chart, illustrating a method of call-forward control in accordance with an exemplary embodiment of the present invention.

Once the subscriber establishes the numbers and related codes, the subscriber can make use of rapid call-forwarding according to the present invention. FIG. 3 is a flowchart illustrating a process the subscriber utilizes to enable rapid call-forwarding in an embodiment of the present invention. In the process shown, the subscriber uses the telephone 104 to enter a feature code, such as "*21." The subscriber then enters the forward code, for example "6." The SSP (106) receives the feature code 302 and the forward code 304. The SSP (106) recognizes the feature code 306 and, in response, executes a trigger 308. The trigger results in the SSP (106) sending a query to the SCP (110) 310. The SSP 104 pauses as the query is routed through the STP (108) to the SCP (110).

The SCP (110) executes the rapid call-forwarding application 312. The application accepts the forward code 314 and instructs the SCP (110) to query the database in the SCP (110), or in the SSP (106) using a Query Request Message for the definition of the forward code 316. Various types of call-forwarding may be implemented in an embodiment of the present invention. In the process shown in FIG. 3, the call-forwarding may be SCP or SSP-enabled. The application executing on the SCP (110) determines whether SCP or SSP-enabled forwarding is to be used 318. Based on the result of this determination, the application instructs the SSP (106) to begin forwarding calls as instructed by the subscriber 324.

Although FIG. 1 illustrates an embodiment implemented in an AIN 102, various other environments are capable of supporting embodiments of the present invention. For example, many telecommunications service providers are utilizing packet-switched networks in conjunction with or instead of a conventional AIN. A packet-switched network is well suited for implementation of an embodiment of the present invention. An embodiment of the present invention may also utilize a PBX system.

In an embodiment of the present invention, the subscriber's preferences with regard to call-forwarding may be limited or expansive. For example, in one embodiment of the present invention, the SCP 110 supports two types of call-forwarding. A subscriber chooses type-one call-forwarding to immediately forward all calls directed to the subscriber's dialing number to a second dialing number. A subscriber chooses type two call-forwarding when the subscriber wishes to specify start or start and end times during which call-forwarding occurs.

In one embodiment of the present invention, the service provider implements a system for accessing and maintaining call-forwarding information. In such a system, the subscriber accesses the system to examine the call-forward codes and associated dialing numbers that are currently stored along with any related information. The subscriber may add, modify, or delete entries as desired.

An embodiment of the present invention may include a call-forward-to log feature. The call-forward-to log allows a subscriber to enter forward-to device numbers and assign a forward-to code to each forward-to dialing number, appearing in the call log. In one embodiment, the telephone 104 includes an LCD display on which the log appears. The subscriber keys on the telephone 104 to control the operation of the call log interface. The subscriber scrolls through the log and selects desired call-forward-to dialing numbers or other addresses. In one embodiment, when a subscriber selects a call-forwarding address, the subscriber activates a <select key>, which causes a forward-to dialing number to be stored. In an alternative embodiment, the call-forwarding feature of the present invention is selected using a feature key, which may also perform other functions related to the telephone 104. The subscriber telephone 104 generates messages to the LCD display, such as a message indicating that call-forwarding service has been activated and indicating the target dialing number.

In one embodiment, the call-forward-to log provides information necessary for billing the customer. A processor (not shown) in communication with the SCP 110 or other element in which the log is stored reads the call log and generates a bill for the customer. The billing software executing on the processor calculates a charge based on the subscriber's use of the call-forwarding service. In another embodiment, the billing software generates a bill, which includes a fixed, monthly charge for the service.

In summary, the present invention provides an easy to use method to forward calls to a target device using a forward code assigned to a target device dialing number. When a subscriber desires a call-forwarding service, the subscriber simply dials the feature code of the call-forward service and then enters the forward code. All calls are then forwarded to the target dialing number by way of the systems described above.

The foregoing is a description of a preferred embodiment of the invention, which is given here by way of example only. The invention is not to be taken as limited to any of the specific features as described, but comprehends all such variations thereof as come within the scope of the appended claims.

That which is claimed:

1. A method for providing call-forwarding, comprising:
receiving via a first telecommunications device a selection of a call-forward-to dialing number, wherein the call-forward-to dialing number is associated with a second telecommunications device, and wherein the call-forward-to dialing number is selected from a plurality of forward-to numbers;
receiving via the first telecommunications device a selection of a call-forwarding type from a plurality of call-forwarding types in a service provider telecommunications network, wherein a type of the plurality of call-forwarding types comprises a subscriber specification a start time and an end time during which forwarding incoming calls to the call-forward-to dialing number occurs;
receiving a feature code in the service provider telecommunications network from a third telecommunications device, wherein the feature code is operable for activating a call-forwarding service;
receiving a forward code instead of the call-forward-to dialing number from the third telecommunications device, wherein the forward code corresponds to the call-forward-to dialing number; and
forwarding the incoming calls directed to the third telecommunications device to the call-forward-to dialing number associated with the second telecommunications device in response to receiving the feature code and the forward code.

2. The method of claim 1, wherein the service provider telecommunications network comprises an advanced intelligent network.

3. The method of claim 1, wherein forwarding the incoming calls comprises switch-based call-forwarding.

4. The method of claim 1, wherein forwarding the incoming calls comprises service control point-based call-forwarding.

5. The method of claim 1, wherein the call-forward-to dialing number and the forward code are stored in a memory of the third telecommunications device.

6. The method of claim 1, further comprising storing the forward-to dialing number and the feature code in a database of a call-forward control computer.

7. The method of claim 1, further comprising receiving call-forwarding logistics.

8. The method of claim 7, wherein the call-forwarding logistics comprise a subscriber profile.

9. The method of claim 7, wherein receiving call-forwarding logistics comprises receiving a file.

10. The method of claim 7, wherein receiving call-forwarding logistics comprises:
presenting a subscriber input form; and receiving call-forwarding logistics from the subscriber input form.

11. The method of claim 1, further comprising generating a call-forwarding record.

12. The method of claim 1, wherein the first telecommunications device comprises the third telecommunications device.

13. The method of claim 1, further comprising receiving provisioning options in the service provider telecommunications network via a menu-based dual tone multiple frequency entry system, the provisioning options comprising the plurality of forward-to numbers and the forward code.

14. A system, comprising a controller to:
receive a selection of a call-forward-to dialing number associated with a first telecommunications device, wherein the call-forward-to dialing number is selected from a plurality of forward-to numbers;
receive a selection of a call-forwarding type of a plurality of call-forwarding types to associate to the call-forward-to dialing number, wherein a type of the plurality of call-forwarding types comprises a subscriber specification of a start time and an end time during which forwarding incoming calls directed to a second telecommunications device to the call-forward-to dialing number occurs;
receive a feature code and a forward code used to activate a call-forwarding service, wherein the forward code corresponds to the call-forward-to dialing number of the first telecommunications device; and connect the incoming calls directed to the second telecommunications device to the call-forward-to dialing number corresponding to the forward code responsive to receiving the feature code and the forward code.

15. The system of claim 14, wherein the controller is adapted to store the dialing number and the forward code in a database.

16. The system of claim 14, wherein the second telecommunications device is operable for storing the dialing number and the forward code.

17. The system of claim 14, wherein the controller is adapted to store call-forwarding logistics.

18. The system of claim 17, wherein the call-forward logistics comprise a subscriber profile.

19. The system of claim 14, wherein a different type of the plurality of call-forwarding types comprises immediately forwarding incoming calls directed to a subscriber dialing number to the call-forward-to dialing number.

20. A switch for providing call-forwarding, comprising a controller to:
   receive and store a call-forward-to dialing number associated with a first telecommunications device, wherein the call-forward-to dialing number is selected from a plurality of forward-to numbers;
   receive and store a selection of a call-forwarding type of a plurality of call-forwarding types to associate to the call-forward-to dialing number, wherein a type of the plurality of call-forwarding types comprises a subscriber specification of a start time and an end time during which forwarding incoming calls directed to a second telecommunications device to the call-forward-to dialing number occurs;
   receive a feature code and a forward code used to activate a call-forwarding service, wherein the forward code corresponds to the call-forward-to dialing number of the first telecommunications device;
   retrieve from a database the call-forward-to dialing number according to the forward code; and
   connect the incoming calls directed to the second telecommunications device to the call-forward-to dialing number responsive to receiving the feature code and the forward code.

21. The switch of claim 20, wherein the is a database stores call-forward-to dialing numbers and corresponding call-forwarding types.

22. The switch of claim 20, wherein a different type of the plurality of call-forwarding types comprises immediately forwarding incoming calls directed to a subscriber dialing number to the call-forward-to dialing number.

23. A telecommunications device, comprising a controller to:
   transmit to a system a selection of a call-forward-to dialing number associated with a second telecommunications device, wherein the call-forward-to dialing number is selected from a plurality of forward-to numbers;
   transmit a selection of a call-forwarding type of a plurality of call-forwarding types to associate to the call-forward-to dialing number, wherein a type of the plurality of call-forwarding types comprises a subscriber specification of a start time and an end time during which forwarding incoming calls directed to a subscriber dialing number to the call-forward-to dialing number occurs;
   receive a feature code and a forward code used to activate a call-forwarding service, wherein the forward code corresponds to the call-forward-to dialing number of the second telecommunications device;
   retrieve the call-forward-to dialing number according to the forward code; and
   connect incoming calls directed to the subscriber dialing number to the call-forward-to dialing number responsive to receiving the feature code and the forward code.

24. The telecommunications device of claim 23, wherein a a different type of the plurality of call-forwarding types comprises immediately forwarding the incoming calls directed to the subscriber dialing number to the call-forward-to dialing number.

25. A telecommunications device, comprising a controller to:
   receive incoming calls redirected from a subscriber dialing number to a call-forward-to dialing number of the telecommunications device,
   wherein the incoming calls are controlled by a system adapted to:
      receive a selection of a call-forward-to dialing number associated with the telecommunications device, wherein the call-forward-to dialing number is selected from a plurality of forward-to numbers;
      receive a selection of a call-forwarding type of a plurality of call-forwarding types to associate to the call-forward-to dialing number, wherein a type of the plurality of call-forwarding types comprises a subscriber specification of a start time and an end time during which forwarding incoming calls directed to a subscriber dialing number to the call-forward-to dialing number occurs;
      receive a feature code and a forward code used to activate a call-forwarding service, wherein the forward code corresponds to the call-forward-to dialing number of the telecommunications device; and
      connect the incoming calls directed to the subscriber dialing number to the call-forward-to dialing number corresponding to the forward code responsive to receiving the feature code and the forward code.

26. The telecommunications device of claim 25, wherein a a different type of the plurality of call-forwarding types comprises immediately forwarding the incoming calls directed to the subscriber dialing number to the call-forward-to dialing number.

* * * * *